Dec. 10, 1946.  W. B. R. AGNEW  2,412,192
METHOD FOR TESTING THE SEALS OF CRYSTAL HOLDERS
Filed Aug. 11, 1944
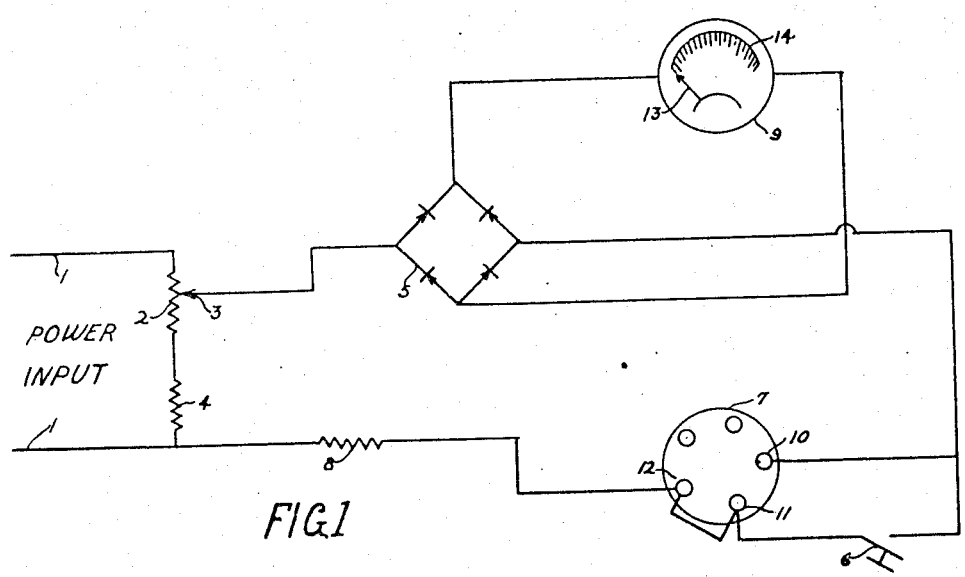
FIG.1
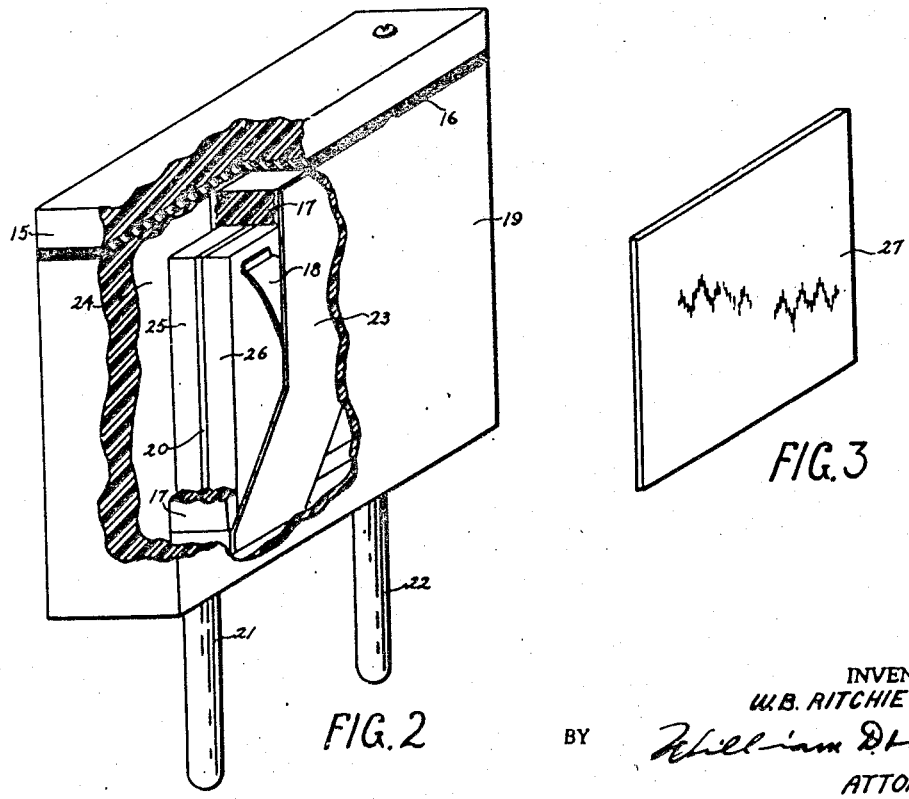
FIG.2
FIG.3
INVENTOR.
W.B. RITCHIE AGNEW
BY William D. Hall.
ATTORNEY Patented Dec. 10, 1946

2,412,192

UNITED STATES PATENT OFFICE 2,412,192

METHOD FOR TESTING THE SEALS OF CRYSTAL HOLDERS

William B. R. Agnew, Dayton, Ohio

Application August 11, 1944, Serial No. 549,084

2 Claims. (Cl. 73—52)

(Granted under the act of March 3, 1833, as amended April 30, 1928; 370 O. G. 757)

The invention described herein may be manufactured and used by or for the Government for governmental purposes, without the payment to me of any royalty thereon.

This invention relates to testing and more particularly to a method for detecting leaks in presumably hermetically sealed apparatus or the like.

In the past, commonly followed methods for determining the presence of leaks in a piece of presumably sealed apparatus by water vapor absorption methods have been by following gravametrical procedures. For the testing of delicately balanced electrical apparatus these methods have proven to be objectionably crude, have required the use of objectionably intricate and expensive apparatus and the expenditure of objectionably long periods of working time.

The objects of the present invention include the provision of a method for the detection of leaks in presumably hermetically sealed apparatus that very largely obviates the objections that are specified above; and a method that occupies materially less time and effort than were required in the methods that have been followed heretofore.

With the above and other objects in view which will be apparent from the following disclosure to those who are informed in the field of the detection of leaks in fine equipment, an illustrative arrangement for carrying out the present invention is shown in the accompanying drawing, wherein:

Fig. 1 is a circuit diagram for the device that is used in following the method of the present invention;

Fig. 2 is a perspective view, partly broken away, of a crystal holder that is illustrative of a device, the effectiveness of the hermetic seal of which is to be determined; and Fig. 3 is a perspective view of a cardboard wafer that is treated chemically to impart hygroscopic properties thereto.

The electrical circuit that is shown in the accompanying drawing is fed from an alternating current power source 1, the terminals of which are bridged by a variable resistor 2, that is adjustably tapped by a sliding contact 3, in series with a fixed resistor 4 or similar potentiometer. Alternating current power is fed in series from the contact 3 thru the alternating current contacts of a full wave rectifier 5, thru a switch 6, that is in parallel with preferably a multiple-contact socket 7, and a circuit resistor 8. A microammeter 9 has its terminals connected across the direct current terminals of the rectifier 5. The microammeter 9 serves to indicate the relative conductivity between the contacts 10 and 11, or 12, of the socket 7 into which two pin contacts of a device to be tested may be removably inserted. A pointer 13 of the microammeter 9 is pivotally mounted to rotate about its end that is remote from its pointed tip. The pointed tip of the pointer 13 moves along a scale 14. The scale 14 preferably is subdivided into one hundred spaces so that relative conductivity of the circuit containing the microammeter 9 may be indicated thereby directly in percentages. A desired number of contacts 11 and 12 of the socket 7 are preferably spaced different distances from the contact 10 so that test devices that carry contact pins that are separated different distances from each other, may be subjected to tests thereon. The variable resistor 2 and fixed resistor 4 may be replaced by an iron core adjustable contact resistor of the "variac" type, if desired.

A crystal holder 19, such as that shown in Fig. 2 of the drawing, is illustrative of a presumably hermetically sealed device, the efficiency of the seal of which is to be tested by the device whose circuit diagram is shown in Fig. 1. The seal on a crystal holder is of importance since the application of ambient air to a crystal 20 that is disposed therein changes the electrical characteristics of the crystal 20 and contributes to its failure in service.

The usual crystal holder 19 has a pair of contact pins 21 and 22 extending therefrom. One pin 21 is connected electrically with a contact plate 23 and the other pin 22 is connected electrically with another contact plate 24. The contact plates 23 and 24 are spaced from each other within the crystal holder 19 to permit the disposition of a pair of electrodes 25 and 26 therebetween. A crystal wafer 20 is interposed between the electrodes 25 and 26 and a spring 18 subjects the assembly to pressure in order that optimum electrical contacts may be maintained among the various parts of the assembly. The electrodes 25 and 26 and the crystal 20 are commonly maintained in alignment with respect to each other by being disposed within a chase 17. The common sources of leaks in this type of assembly are at the junctions of the pins 21 and 22 with the crystal holder 19 and around a gasket 16 that is disposed between the contacting parts of the holder 19 and the cap 15 therefor. Where a pilot light is desired within the instrument case that houses the circuit that is shown in Fig. 1, a neon bulb is recommended because of its low heat emission. Internal heat has been found to affect the stability of the instrument.

In the conduction of leakage tests by the use of the apparatus that is disclosed herein, the crystal 20 is replaced with a dehydrated chemically treated cardboard wafer or blank 27 of substantially the same dimensions as the crystal 20. The cardboard wafer 27 is prepared for use by having been immersed in a suitable solution of a hygroscopic salt, preferably at reduced pressure to more thoroughly impregnate the cardboard with the solution. An illustrative solution of a hygroscopic salt that has proven to be satisfactory in the testing of crystal holders comprises one volumetric part of lithium chloride with six volumes of distilled water, ethyl alcohol or other suitable liquid or solvent. The lithium chloride may be replaced by other hygroscopic salts, such as those of calcium, barium, strontium or caesium where satisfactory results are obtained therefrom. The cited particular proportionate parts of the hygroscopic salt and its solvent may be varied as desired where satisfactory results are obtained thereby. The solution with the blanks immersed therein is preferably placed in a bell jar that can be evacuated preferably to a reduced pressure of substantially one-half inch of mercury, or the like, for at least one hour, and preferably the blanks are permitted to remain in the solution over-night.

The blanks 27 are then removed from the solution and placed upon a smooth, flat surface upon which they are dried in any suitable manner. Preferably the blanks are dried in an oven at one hundred degrees centigrade until all moisture has been excluded from the blanks or until they are fully dehydrated. They can then be stored in a moisture-tight desiccator or the like, until ready for use. Considerable care should be used at this stage of the tests in the handling of the blanks because of their brittleness when ready for use or when so processed.

The presence of the dried lithium chloride that remains in dried form upon the blanks 27 makes them very sensitive to even slight traces of water vapor when subjected to tests by the use of the apparatus and by following the method that is outlined herein.

All parts of the crystal holder are then thoroughly dried in any approved manner and the chemically treated wafer 27 is installed and sealed therein, care being exercised to complete the sealing operation in the absence of moisture or before any moisture vapor can be absorbed by the chemically prepared blank 27 or adsorbed upon any of the surfaces that are disposed within the crystal holder 19.

The depression of the circuit switch 6 energizes the circuit from the power source 1 and causes direct current to flow between the direct current contacts of the rectifier 5 and thru the microammeter 9. The microammeter needle 13 travels along the scale 14 and preferably is caused to come to rest with its pointed tip in alignment with the reading 100 thereon by the adjustment of the contact 3 upon the resistor 2.

The pin contacts 21 and 22 of the device to be tested for leaks are then disposed in the female socket contacts 10 and 11, or in the contacts 10 and 12 depending upon the distance separating the pins 21 and 22, to bridge the switch 6 and the switch 8 is opened. If there is no water vapor absorption by the hygroscopic salt with which the cardboard wafer 27 is impregnated, there is no deflection of the microammeter needle 13 and it continues to remain at the reading zero. In the event that there is a leak, however, in the crystal holder 19 and ambient air penetrates to the wafer 27, the hygroscopic salt thereon begins to become moist, ionizes and conducts current between the electrodes 25 and 26. This conduction of current causes the microammeter needle 13 to assume a larger reading. Readings taken periodically indicate the increased conductivity of the hygroscopic salt with which the wafer 27 is impregnated. In the event that a leak is present in the crystal holder 19 the microammeter needle 13 moves toward the right and stops at the relative percentage of moisture present. In the event that there is no leak in the crystal holder 19 the microammeter needle 13 remains at zero. The successive microammeter needle readings provide data from which a graph may be made of the rate of leakage or absence thereof of a particular crystal holder 19 which will be readily apparent over a period of time. Since the microammeter scale 14 is divided into one hundred unit distances, the successive readings indicate directly in percentage the relative surface leakage of current across the electrodes 25 and 26, since the circuit with the switch 6 open reads zero and closed reads one hundred as adjusted by the sliding contact 3 on the adjustable resistor 2.

It is to be understood that the components and their arrangement in the circuit that has been disclosed herein, and the method for making leakage determinations in equipment, that have been submitted herein, have been cited for the purposes of illustrating and explaining one embodiment of a device for use in making leakage determinations, and one method of making such determinations, in conformity with the present invention, and that suitable substitutions, modifications and changes may be made therein without departing from the present invention as defined by the appended claims.

What I claim is:

1. A method for testing the seal of a crystal holder, comprising the steps of providing a cardboard blank having dimensions substantially duplicating those of the crystal and infused with a solution of substantially one volume of lithium chloride in six volumes of water, drying the blank, mounting the blank under spring pressure between flat faced electrodes within the crystal holder contacting the blank substantially uniformly throughout the opposite faces thereof, dehydrating the holder, determining the electrical resistance of the encased dehydrated blank, sealing the holder and ageing the crystal holder in a surrounding atmosphere containing water vapor, and again determining the electrical resistance of the blank as an index of leakage of the holder.

2. A method for testing the seal of a crystal holder having crystal clamping means for supporting a crystal and external electrical terminals connected thereto, comprising inserting a wafer of insulating material impregnated with a dehydrated hygroscopic electrolyte in the place of the crystal between said clamping means, sealing the crystal holder, dehydrating the sealed holder and its enclosed wafer placing the crystal holder in an external atmosphere containing aqueous vapor, and observing the course of the resistance of said wafer by electrical measurement through the terminals.

WILLIAM B. R. AGNEW.